US011879252B2

(12) United States Patent
Williams, II

(10) Patent No.: US 11,879,252 B2
(45) Date of Patent: Jan. 23, 2024

(54) ROOF SCUPPER OVERFLOW WITH SENSOR

(71) Applicant: Matthew Curtis Williams, II, Sonora, KY (US)

(72) Inventor: Matthew Curtis Williams, II, Sonora, KY (US)

( * ) Notice: Subject to any disclaimer, the term of this patent is extended or adjusted under 35 U.S.C. 154(b) by 0 days.

(21) Appl. No.: 17/718,294

(22) Filed: Apr. 11, 2022

(65) Prior Publication Data

US 2022/0325527 A1 Oct. 13, 2022

Related U.S. Application Data

(60) Provisional application No. 63/304,392, filed on Jan. 28, 2022, provisional application No. 63/173,472, filed on Apr. 11, 2021.

(51) Int. Cl.

*E04D 13/04* (2006.01)
*G08B 21/18* (2006.01)

(52) U.S. Cl.

CPC ......... *E04D 13/0431* (2013.01); *G08B 21/18* (2013.01); *E04D 2013/0413* (2013.01)

(58) Field of Classification Search

CPC ........ E04D 13/0431; E04D 2013/0413; G08B 21/18

See application file for complete search history.

(56) References Cited

U.S. PATENT DOCUMENTS 1,663,777 A * 3/1928 Sargent ................. E03F 5/0407 114/182
1,917,805 A * 7/1933 McManus ................. E03F 7/04 210/117
2,093,515 A * 9/1937 Filkins ................ E04D 13/0431 137/527.6
3,884,809 A * 5/1975 Logsdon ............. E04D 13/0409 210/163
4,404,981 A * 9/1983 Valenti .................... F16K 13/04 137/67
5,562,819 A * 10/1996 Turner, Jr. ............. B01D 29/96 210/170.03
6,287,050 B1 * 9/2001 Montgomery ........... F24F 11/76 52/573.1
8,365,487 B2 * 2/2013 Krusec ................ E04D 13/1693 52/90.2
9,091,033 B2 * 7/2015 Nakayasu ................. E02B 7/44
9,279,242 B2 * 3/2016 Alvarado .................. E03F 5/06
9,528,239 B2 * 12/2016 Nakayasu ............... E02B 3/104

(Continued)

*Primary Examiner* — James M Ference

(74) *Attorney, Agent, or Firm* — Carrithers Law Office, PLLC; David W. Carrithers

(57) ABSTRACT

The roof scupper overflow with sensor cooperatively engages and replaces a conventional roof opening through a wall or in a corner to prevent trash from reaching and clogging the conventional roof basket and drain. Accumulating trash builds up on the screen of the roof scupper overflow causing a foam float or buoy connected to a trash tray to rise permitting water to run under the trash trap at roof level. The trash tray is retained to a base with magnets. When the water reaches a predetermined level, the foam buoy rises pulling the trash tray away from the base allowing water to flow to the conventional roof drain basket and activating a magnet switch sending a signal to overflow sensor and a control module connected to WIFI service.

12 Claims, 3 Drawing Sheets

(56) References Cited

U.S. PATENT DOCUMENTS

| | | | | |
|---|---|---|---|---|
| 9,551,153 | B2 * | 1/2017 | Anderson, Jr | E04D 13/0431 |
| 10,161,093 | B2 * | 12/2018 | Adler | E02B 7/36 |
| 10,428,529 | B1 * | 10/2019 | Tanghongs | E04D 13/0643 |
| 10,571,141 | B1 * | 2/2020 | Gray | E04D 13/006 |
| 2002/0021941 | A1 * | 2/2002 | Montgomery | F24F 11/76 405/92 |
| 2003/0082008 | A1 * | 5/2003 | Sprengle, Sr. | E02B 7/40 405/87 |
| 2006/0000153 | A1 * | 1/2006 | Banks | E04D 13/0431 52/11 |
| 2007/0205144 | A1 * | 9/2007 | Robinson | E04D 13/0767 210/163 |
| 2009/0223147 | A1 * | 9/2009 | Spignesi | E04F 17/00 52/302.3 |
| 2010/0307620 | A1 * | 12/2010 | May | E04D 13/08 137/602 |
| 2014/0140770 | A1 * | 5/2014 | Nakayasu | E02B 7/40 405/107 |
| 2014/0328628 | A1 * | 11/2014 | Nakayasu | E02B 7/44 405/26 |
| 2015/0218785 | A1 * | 8/2015 | Shapiro | E04D 13/0431 137/357 |
| 2015/0337583 | A1 * | 11/2015 | Fukagawa | E06B 9/04 49/23 |
| 2016/0298335 | A1 * | 10/2016 | Anderson, Jr. | E04D 13/0431 |
| 2020/0032501 | A1 * | 1/2020 | Brooksbank | G01F 23/268 |
| 2022/0316214 | A1 * | 10/2022 | Williams, II | G01F 23/0007 |
| 2022/0325527 | A1 * | 10/2022 | Williams, II | G08B 21/18 |

* cited by examiner

ROOF SCUPPER OVERFLOW WITH SENSOR

REFERENCES TO RELATED APPLICATIONS

This application is a continuation-in-part of U.S. Application Ser. No. 17/711,000 filed on Mar. 31, 2022 and claims priority from U.S. Provisional Application Ser. No. 63/304,392 filed on Jan. 28, 2022 and U.S. Provisional Application Ser. No. 63/173,472 filed on Apr. 11, 2021, all of which are incorporated by reference in its entirety.

FIELD OF THE DISCLOSURE

The present invention relates to roof drains and scuppers to prevent flooding on roofs.

BACKGROUND OF THE INVENTION

Commercial and industrial buildings are typically constructed with flat or near flat roofs. Because these buildings do not have much if any of a pitch to the roof the collection of water on the roof surface results from rain and melting snow can present a structural load resulting in damage to the roof structure or rooms below. Most commercial and industrial building standards require that roofs of this type include drains or scuppers positioned at locations that ensure the majority of water accumulation may be removed from the roof through a drainage plumbing system. A scupper is an opening in the sidewall of a wall surrounding a roof which allows water to drain through the wall or corner drain instead of pooling on the roof top or within the curbing or walls of a building.

Typical roof scuppers are installed on flat roofs by cutting a hole through the roof curb or sidewall surrounding the roof and installing a drain connecting to a drain pipe that carries the water away. The drain apparatus typically include flashing and a collar made from flanges that is attached using an adhesive or sealant to create a water tight seal preventing leakage at the site of the drain. Typical drain structures include some form of drain ring and under deck clamping ring or structure that holds the drain in place and prevents its inadvertent removal or dislodgement from its installed position. The opening of the roof scupper is typically covered by some form of grating or strainer structure to prevent the ingestion of large objects into the drain plumbing system. In most roof drain structures this strainer or grate takes the form of a strainer having openings there through to prevent or minimize the occurrence of obstruction of the roof drain through the accumulation of leaves and other debris that may accumulate on the roof.

Despite the inclusion of a strainer or other grating structure, many roof scuppers and drains still become plugged or obstructed from removing the accumulated water from the roof of the building. These obstructions can occur as a result of the collection of debris around or over the grate or strainer structure. Melting ice in the winter may also obstruct water flow resulting in blockage of the roof drain system during winter months as a result of icing near the roof level of the open areas of the strainer. Minor obstructions that result in the reduction in the rate of water removal from the roof may also result in undo stress on the roof structure that may endanger its integrity and allow water to get into roof insulation which evaporates and bubbles up a roof destroying it. Additionally, even unobstructed roof drains may not be able to remove water at a rate to prevent its undue accumulation during periods of heavy storms and intense rainfall resulting in collapse of a roof.

New building designs require overflow drains designed to hold a twelve foot lake if the drain is stopped-up, and are connected to the same down pipe as the drain pipe which is usually six feet away from a sumped drain. The sump has a four inch pipe on it which also holds a twelve foot lake and is connected to the same down pipe as the drain pipe. However, not all buildings have overflow drains. A lot of roofs are usually wet around the roof drains from ponding which lets water vapor move thorough the insulation resulting in damage to the electrical system and roof and wall insulation.

Conventional backup roof drains are typically constructed in the same manner as the primary roof drains, but include a structure that prohibits the drainage of water through the backup roof drainage system until the level of the water reaches a predetermined depth. Typically the entry ports or slots on the backup roof drains are positioned at a height above the roof surface. This height is preferably chosen based upon the roof construction such that the weight of the water at that given height is well within the load carrying of the roof structure. The separate drainage system ensures that failure of the primary roof drain system due to an obstruction in the drainage system downstream from the roof drains will not effect the ability of the backup roof drain system to remove the water that accumulates above a given depth.

Conventional roof drain systems collect water and carry away from a roof but do not indicate to a building owner (or tenant) the status of the system. Where the primary roof drain or scupper is plugged or malfunctioning and the backup drain is operating to relieve the roof of water, the need to maintain either one or both of the drains needs to be communicated to the party responsible for maintenance of the structure so that measures can be taken to unplug or fix the primary drain.

The instant invention includes a system capable of notifying a building owner or tenant that a backup drain or scupper has been called upon and/or that the primary system has been compromised.

SUMMARY

The roof scupper overflow with sensor cooperatively engages and replaces a conventional roof scupper to prevent trash from reaching and clogging the conventional roof scupper and drain. Accumulating trash builds up on the screen and sieve tray of the overflow prevention device causing a float or buoy connected to a trash tray to rise with the rising water level. The trash tray is retained to a base with magnets and held down unless trash clogs the screen and the water level rises. When the water reaches a predetermined level, the buoy, sieve tray and screen rises pulling the trash tray away from the base allowing water to flow to the conventional roof drain basket and activating an overflow sensor and a control module. The control module is in communication with the water flow sensor and includes an indicator which is activated when the water flow sensor detects the detachment of the trash tray from the base indicating a potential flooding situation with the roof drainage system.

The roof scupper overflow with sensor cooperatively engages and replaces a conventional roof opening through a wall or in a corner to prevent trash from reaching and clogging the conventional roof basket and drain. A buoy affixed to the sieve tray and screen rises in accordance with the water level, so that when the buoy connected to a screen and trash sieve tray rises when the water gets high enough to pull it away from the magnets that hold it down to the base plate attached to the roof forming a water tight seal. Once trash has accumulated and built up on the screen the sieve tray and screen affixed thereto.

The roof scupper overflow has a base plate that is affixed to the roof forming a water tight seal with the roof. The roof scupper overflow includes a rectangular upright frame mounted to the base plate defining a base plate and opposing vertical elongated frame side members having top distal ends connecting to an elongated top bar. The WIFI sensor module is supported on top of the top bar.

A rectangular housing is disposed between the base plate, elongated side members and top bar of the scupper overflow frame. A slidable housing cooperatively engages the frame. The slideable housing includes a bottom defining a trash tray or a "sieve tray" and a pair of aligned opposing housing sidewalls having a bottom edge connecting to the outside edges of the sieve tray. The opposing housing sidewalls include inwardly extending flanges extending long the vertical outer edges. A top flange extends inwardly from the top edges of the side flanges and may optionally attached at the end edges to the upper end edge of the opposing side flanges.

A screen extends across the bottom portion of the front end, (the water entrance) of the housing, extending from the opposing housing sidewalls a selected height from the bottom and with the bottom of the screen affixed to the top surface of the sieve tray and the top of the screen affixed to the bottom of the buoy. The sieve tray comprises a rectangular plate having a plurality of teeth projecting from the periphery thereof extending forward or up-turned along the front edge and a plurality of perforations such as slits or holes therethrough. One or more magnets or magnetic strips are mounted onto the bottom surface of the sieve tray in magnetic engagement with a steel base plate or a magnetic or steel strip affixed to a top surface of a non-metallic base plate; or alternatively one or more magnets or magnetic strips are mounted onto the top surface of the base plate in magnetic engagement with a steel sieve plate or a magnetic or steel strip affixed to non-magnetic bottom surface of the sieve tray.

The rectangular foam block forming a closed cell foam buoy 28 extends from one housing sidewall to the opposing housing sidewall and is slidably held between the housing sidewall flanges and the housing top flange. The foam buoy may be composed of STYROFOAM having a coating or comprise and air filled buoy or a container filled with particles of cork, foam, or other material which floats on water. The foam buoy is spaced above the sieve tray on the front of the housing. In one preferred embodiment, the foam buoy 28 lower inner wall portion 36 attaches to an upper screen portion 38. Floating of the foam buoy 28 raises the screen 30 and sieve plate attached thereto.

The vertically positioned screen is contiguous to the sieve plate and spaced apart a selected distance from the inner edge affixed to an inner solid portion surface of the sieve plate. The screen preferably comprises ½ inch screen for catching leaves or trash disposed between the buoy made of foam and the sieve tray trash tray.

When the trash builds up around the screen, the water will raise the float causing it to pop up from magnets and move upward where it will contact magnets at the top of the device holding it into position to let water run into the drain at roof level. When the buoy pops up it also sets off a magnet switch that will send a text message and emails to the addresses of the building and which drain it effected to the designated entity providing a location, time, and date or the report. The sensor requires a magnetic switch, a wifi signal, and battery.

Water pressure created from ponding of water on the roof pushes the trash tray up for it to move one way or the other over four sets of steps. When it raises up it activates a magnet switch sending a text message and email to whoever is selected in accordance with a computer program or application receive the information and to provide an alert that the trash needs to be cleaned around the drain and the alarm system parameters need to be reset.

A side screen supported by a slotted side arm and connecting top arm are mounted to the frame. Side screen panels are affixed between the adjustable arms projecting from the sides of the frame and can be mounted at a selected angle to the roof curb or side-wall or rim or flange surrounding a flat roof to prevent debris from moving around the roof scupper. The side screens are as high as the top of the roof scupper device. It is contemplated the arms may be hinged or the screens may be pliable and bent into position for affixation to the existing roof rim or curb.

The invention lets the accumulated water drain at roof level to the existing roof drain and alerts the maintenance group regarding the status of the roof drain and water accumulation when no one is on the roof.

More particularly, the roof drain overflow and WIFI sensor module have a base plate having a center rectangular opening and inner edge for attachment to a roof. The base plate supports a sieve tray serving as a "trash tray", The sieve tray comprises an a disc having a plurality of teeth projecting from the periphery thereof and a plurality of perforations such as slits or holes therethrough, and includes an open center portion surrounded by an inner edge defining the trash tray affixed to the base plate, A conventional roof drain strainer cap is disposed in the center of the sieve tray and base plate attaching to roof having a watertight seal with the surface of the roof formed by sealing with a sealant such as a caulk, cement, glue, rubber se3am tape, PVC tape, or other adhesive means and is stripped in with the roofing materials which are consistent with those used on the roof A foam buoy is disposed within a housing slidable within a frame supported by the base plate, A vertically positioned screen is contiguous to the sieve plate and spaced apart a selected distance from the inner edge affixed to an inner solid portion surface of the sieve plate. A foam buoy comprising a foam material has a lower inner wall portion attaching to an upper screen portion. Floating of the foam buoy raises the screen and sieve plate attached, thereto. The WIFI sensor module is supported by the frame bar.

A pair of wires extend from the WIFI module down the support arms to a pair of spaced apart opposing magnetic switches affixed to a top surface of the inner edge portion of the base which hold the sieve plate thereto until a sufficient level of water floats the buoy.

It is an object of the present invention to provide a overflow device having a sensor and means for communicating the status of the level of the water of a roof for a particular roof drain and scupper to a maintenance center and selected individuals.

It is an object of the present invention for the overflow prevention and sensor device to have a communication module mounted over the top of the roof scupper in electrical communication with sensors by a wire attaching to the buoy for sending email, phone, or text messages.

It is another objet of the present invention for floating means such as an air filled float, or foam float or air filled or foam buoy and sieve tray and rear screen to remain in the lowered resting position with magnet holding down the buoy until the level of the water raises the buoy, screen, and sieve tray and trash collected thereon enough to allow water to flow underneath it.

It is another object of the present invention to include add-ons to increase the size of the scupper unit in selected increments of for example one inch in order for the foam float to raise up when the trash gets inside the screen so that it will let water flow out at roof level.

It is another object to be able to send a text message and email to a designated entity.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

A better understanding of the present invention will be had upon reference to the following description in conjunction with the accompanying drawings in which like numerals refer to like parts throughout the several views and wherein.

DETAILED DESCRIPTION OF THE PREFERRED EMBODIMENT

Figure 1:
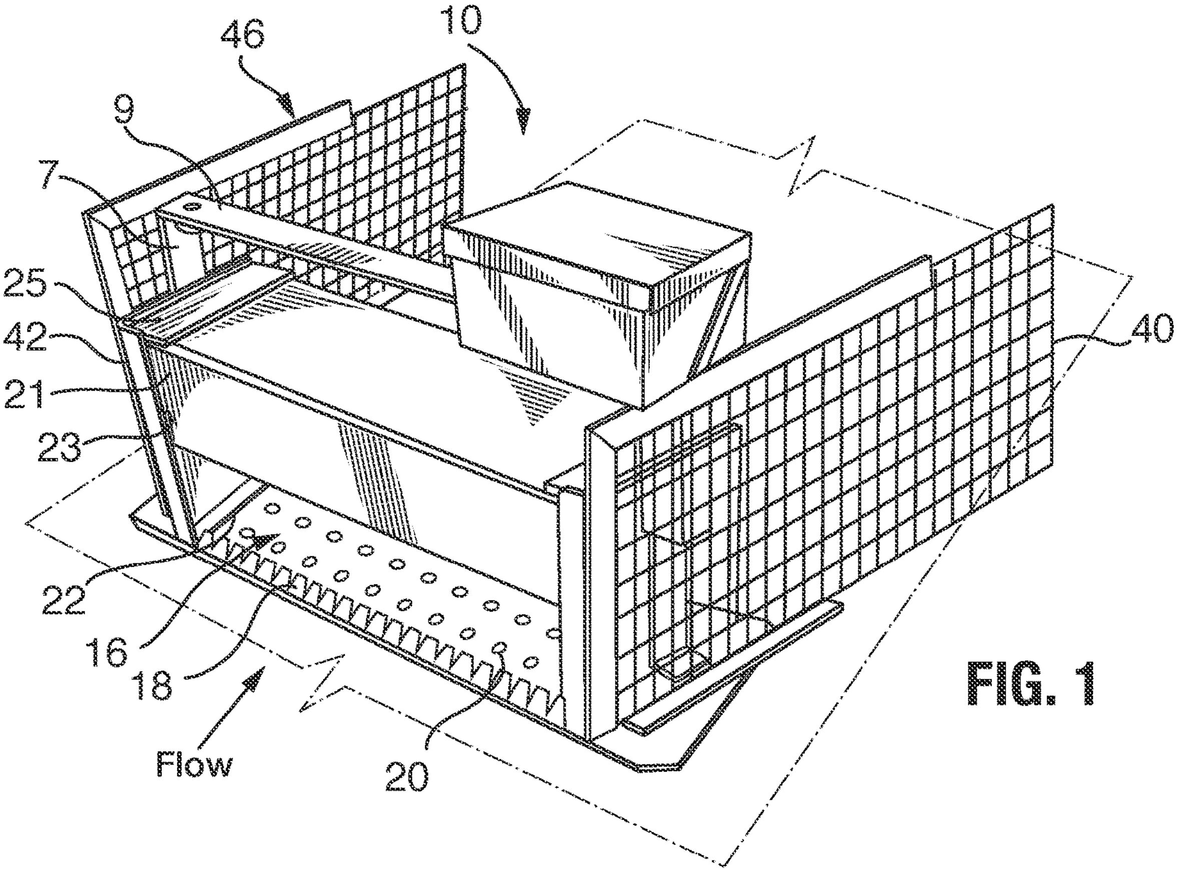
FIG. 1 is a perspective front end view of the roof scupper overflow device and sensor showing the sensor housing and magnet switch module, foam buoy, screen mounting to a trash sieve tray including drain holes and teeth, and base plate with magnets and positioning members and side screens with an arrow indicating water flowing into the device.

For the purposes of promoting an understanding of the principles of the invention, reference will now be made to the embodiment illustrated in the drawings and specific language will be used to described the same. It will nevertheless be understood that no limitation of the scope of the invention is thereby intended, such alterations and further modifications in the illustrated device, and such further applications for the principles of the invention as illustrated therein being contemplated as would normally occur to one skilled in the art to which the invention relates.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "about" can be reasonably appreciated by a person skilled in the art to denote somewhat above or somewhat below the stated numerical value, to within a range of ±10%.

The information included in this section, data or specifications, including any references cited herein and any description or discussion thereof, is included for exemplary purpose only and is not to be regarded as subject matter by which the scope of the invention as defined in the claims appended hereto is to be bound.

The following text sets forth a broad description of numerous different embodiments of present disclosure. The description is to be constructed as exemplary only and dose not describes every possible embodiment since describing every possible embodiment would be impractical if not impossible. It will be understood that any feature, characteristic, component, composition, ingredient, product, step or methodology described herein can be deleted, combined with or substituted for, in whole or part, any other feature, characteristic, composition, ingredient, product, step or methodology described herein. Numerous alternative embodiments could be implemented, using either current technology or technology developed after the disclosure date of the invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention includes a water level sensor attached to the trash tray for indicating a selected volume of water has accumulated on the roof, a communication system disposed within a housing positioned on the on support member above the drain for transmitting measurement data received from the water level sensor.

FIGS. 1-8 show the roof scupper overflow 10 and WIFI sensor module 15 showing an base plate 14 for attachment to a roof. The base plate 14 attaches to the roof having a watertight seal with the surface of the roof formed by sealing with a sealant such as a caulk or adhesive and is stripped in with the roofing, materials which are consistent with those used on the roof. The base plate may include four spaced apart aligned holes around the outer periphery for affixing to the roof support structure.

The roof scupper overflow 10 base plate 14 is affixed to the roof forming a water tight seal with the roof. The roof scupper overflow includes a rectangular upright frame 12 mounted to the base plate 14 having opposing vertical elongated frame side members 7 having top distal ends connecting to an elongated top bar 9. The WIFI sensor module 15 with batteries is supported on the top bar 9 and includes means for electrically connecting to a magnetic switch.

A rectangular sliding housing 3 is disposed between the base plate 14, elongated side members 7 and top bar 9 of the scupper overflow frame 12. The slidable housing 3 slidably engages the frame 12 to move up and down within the frame. The slideable housing 3 includes a bottom defining a trash tray or a "sieve tray" 16 and a pair of aligned opposing housing sidewalls 19, 21 having a bottom edge 22 connecting to the outside edges of the sieve tray. The opposing housing sidewalls 19, 21 include an inwardly extending front flange 23 and rear flange 24 extending along the vertical outer edges. A top flange 25 extends inwardly from the top edges of the side flanges and may optionally attached at the end edges to the upper end edge of the opposing side flanges.

The base plate 14 supports a sieve tray 16 serving as a "trash tray". The sieve tray 16 comprises an rectangular plate having teeth 18 projecting from the periphery thereof and which may be up-turned around the edges forming an up-turned rake. The sieve tray 16 includes openings 20 therethrough, for example, a plurality of perforations such as slits or holes therethrough. One preferred embodiment includes a sieve tray comprising a rectangular plate having a plurality of teeth projecting from the periphery thereof extending forward or up-turned along the front edge and a plurality of perforations such as slits or holes therethrough. Magnetic means comprising one or more magnets 26 or magnetic strips are mounted onto the bottom surface of the sieve tray in magnetic engagement with a steel base plate or a magnetic or steel strip 27 affixed to a top surface of a non-metallic base plate; or alternatively one or more magnets or magnetic strips are mounted onto the top surface of the base plate in magnetic engagement with a steel sieve plate or a magnetic or steel strip affixed to non-magnetic bottom surface of the sieve tray.

The rectangular foam block forming a closed cell foam buoy 28 extends from one housing sidewall to the opposing housing sidewall and is slidably held between the housing sidewall flanges and the housing top flange 25. The foam buoy may be composed of STYROFOAM having a coating or comprise and air filled buoy or a container filled with particles of cork, foam, or other material which floats on water. The foam buoy is spaced above the sieve tray positioned near the front of the scupper. In one preferred embodiment, the foam buoy 28 lower inner wall portion 36 attaches to an upper screen portion 38. Floating of the foam buoy 28 raises the screen 30 and sieve plate 16 attached thereto.

A screen extends across the bottom portion of the front end, (the water entrance) of the housing, extending from the opposing housing sidewalk a selected height from the bottom and with the bottom of the screen affixed to the top surface of the sieve tray and the top of the screen affixed to the bottom of the buoy.

The vertically positioned screen 30 is contiguous to the sieve plate and spaced apart a selected distance from the inner edge affixed to an inner solid portion surface of the sieve plate. The screen preferably comprises ½ inch screen for catching leaves or trash disposed between the buoy made of foam and the sieve tray trash tray. It is contemplated that screens having a mesh size ranging from ⅛ inch to 1 inch can be utilized with the roof scupper and that multiple screens could be mounted in a frame each screen having different size mesh. The screen preferably comprises ½ inch screen for catching leaves or trash disposed between the buoy made of foam and the sieve tray trash tray.

The foam buoy 28 comprising a foam material has a lower inner wall portion attaching to an upper screen portion 38. Floating of the foam buoy 28 raises the screen 30 and sieve plate 16 attached thereto. By utilizing the screen together with the sieve tray, debris blocking the flow of water is lifted up with the sieve tray, rather than being able to accumulate under the sieve tray. The steps enable the float and sieve tray to lower upon drainage of the water to an acceptable level, whereby water flows under the sieve tray supported by the steps.

A pair of opposing side screens 40 are supported by a slotted side arm 42 and connecting top arm 44 and bottom arm 45 forming side screen panels 46 mounted to the frame 12. Side screen panels 46 are affixed between the adjustable arms 42 projecting from the sides of the frame and can be mounted at a selected angle to the roof curb or sidewall or rim or flange surrounding a flat roof to prevent debris from moving around the roof scupper. The side screens are as high as the top of the roof scupper device. It is contemplated the arms may be hinged or the screens may be pliable and bent into position for affixation to the existing roof rim or curb.

The WIFI sensor module 15 is supported by the top bar 9 whereby the WIFI (including transmitter and receiver) and magnetic switch module 40 is spaced apart from and mounted on the housing flange 23 and frame. Wires 46 extend from the WIFI module down the frame members to a pair of spaced apart opposing magnetic switches 60 affixed to a top surface of the inner edge portion of the base which hold the sieve plate thereto until a sufficient level of water floats the buoy. At least one magnet 48 is affixed to the top surface of the sieve tray and is in magnetic communication and cooperative engagement with the magnet switch extending from wires mounting to the base plate.

Figure 2:
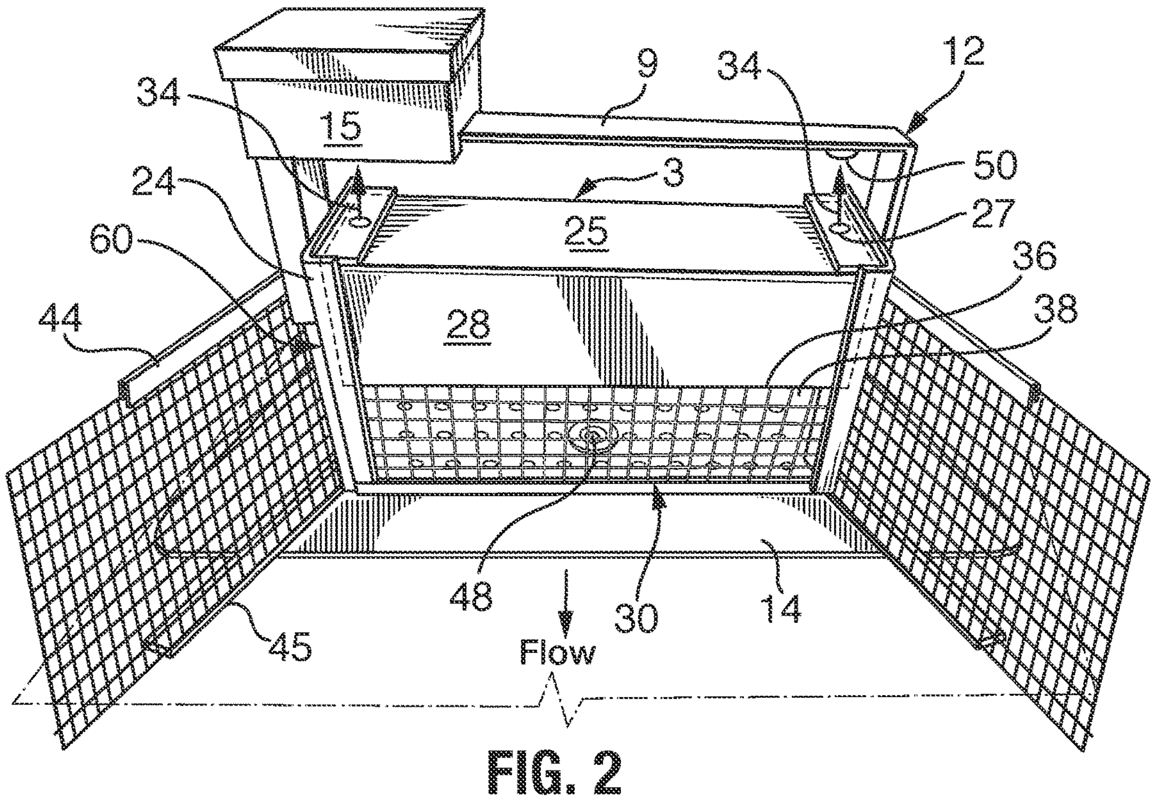
FIG. 2 is a perspective rear end view showing a roof scupper overflow device and sensor showing the sensor housing and magnet switch module, foam buoy, screen mounting to a trash sieve tray including drain holes and teeth, and base plate with magnets and positioning members and side screens with an arrow indicating water flowing out of the device.
Figure 3:
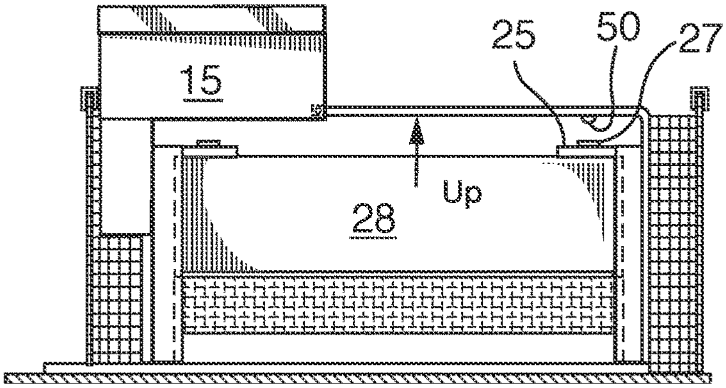
FIG. 3 is a rear view of the roof scupper overflow device in the resting position with the float, screen and sieve tray in the down position.
Figure 4:
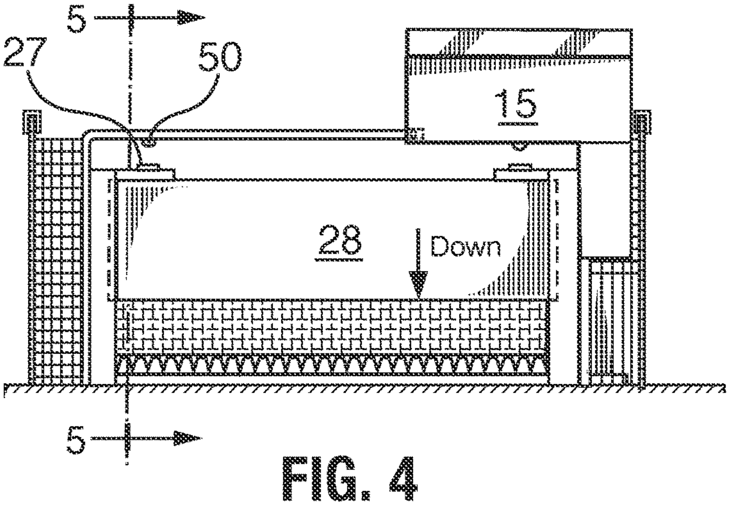
FIG. 4 is a front view of the roof scupper overflow device in the resting position with the float, screen and sieve tray in the down position.
Figure 5:
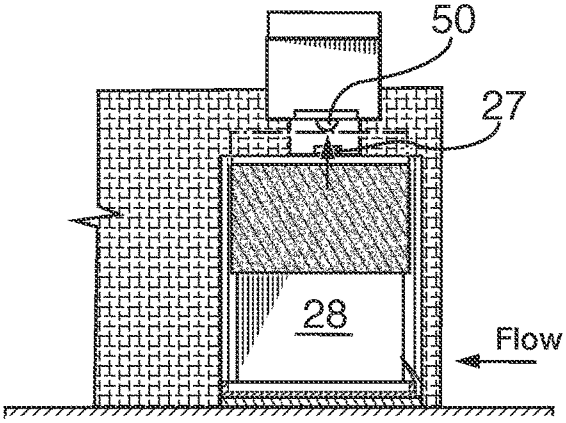
FIG. 5 is a left side sectional view of the roof scupper overflow device of FIG. 4 in the resting position with the float, screen and sieve tray in the "down" position.
Figure 6:
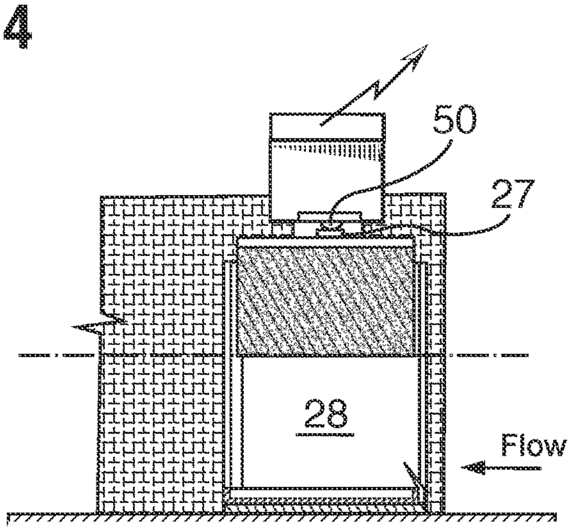
FIG. 6 is a left side view of the roof scupper overflow device in the raised position with the float, screen and sieve tray in the "up" position.
Figure 7:
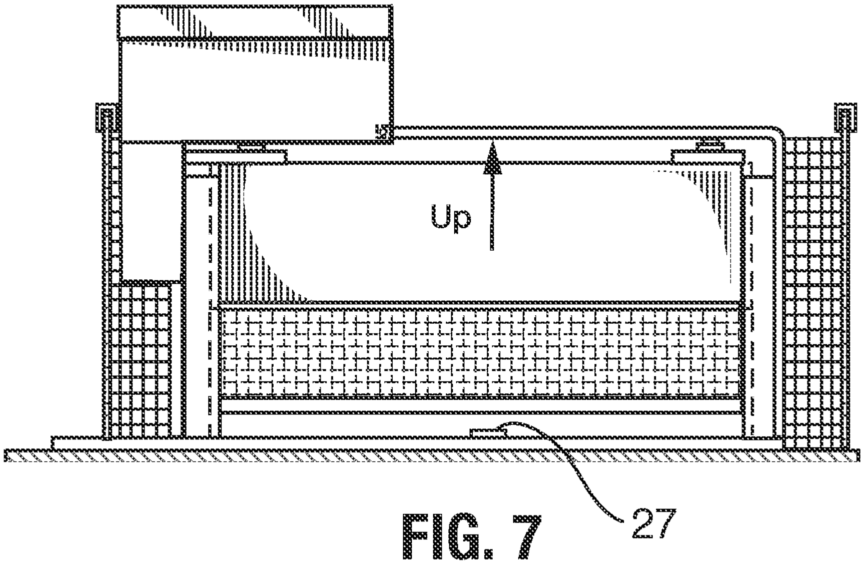
FIG. 7 is a rear view of the roof scupper overflow device in the resting position with the float, screen and sieve tray in the "up" position.
Figure 8:
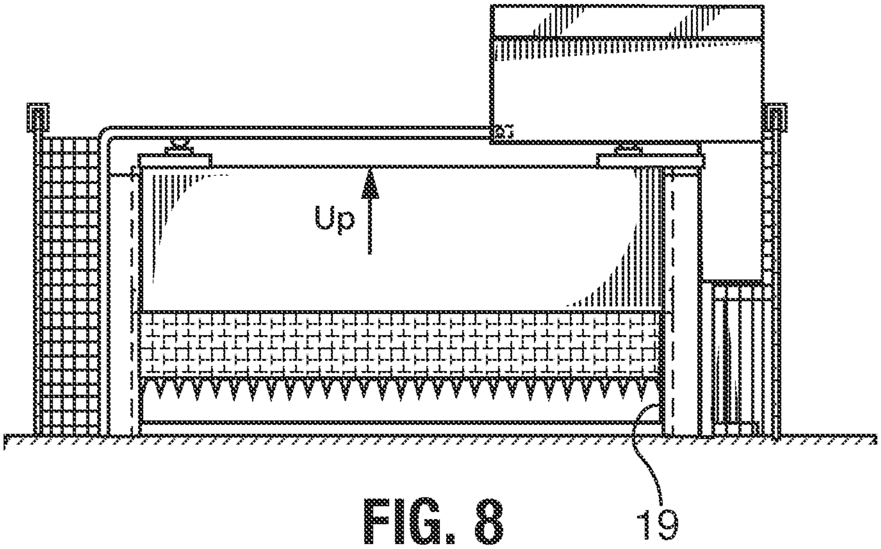
FIG. 8 is a front view of the roof scupper overflow device in the raised position with the float, screen and sieve tray in the "up" position.

At least one sieve tray support magnetic members 50 may be spaced apart in opposed alignment on the top portion adjacent the inner edge of the top bar of the frame to support the sieve tray 16, buoy 28, and screen 30 so that when water rises and the buoy floats upward pulling the sieve tray up whereby the housing 3 includes magnets or magnetic strip material 27 which cooperatively engages magnets of magnetic material 50 on the frame top bar 9 as shown by the arrows 34 in FIG. 2 until the level of the water subsides and the scupper is reset. The base plate may be composed of a magnetic material such as steel or have magnets or magnetic material strips or pads such as steel disposed onto the surface thereof for cooperative magnetic engagement with opposing magnets affixed to the underside of the sieve tray 16 or for cooperative engagement with a sieve tray 16 composed of a magnetic material. Magnetic pads or magnets positioned on the lower surface of the frame top bar 9 magnetically engage magnets or magnetic material on the top surface of the housing to hold the screen and sieve tray and debris up and let water pour through below in clogged drain situations.

The perforated barrier such as the cylindrical screen 30 attaching to the lower portion of the inner wall of the buoy allows the buoy to rise when the water level rises and lifts the buoy, screen and sieve tray to permit the water to discharge through the cavity below the housing, in addition the raising of the buoy completes a circuit to send a text and email or other communication to create an alert to a maintenance group to enable a roofing company or plumber to investigate, fix, and/or repair the drain system.

The overflow sensor in the module monitors the condition of the backup roof drainage system and immediately notifies a building owner (or tenant), maintenance, or designated party by electronic means such as an text, electronic mail, audio, and/or visual message via WIFI if the backup roof drainage system is called upon to convey water from a building's roof. The sensor may also indicate if the batteries powering the system are depleted. The monitor is shown installed in a housing powered by batteries and/or a solar panel on a support structure over the drainage device above the water level in electrical communication with sensors attaching to the trash tray which are in electrical communication with magnets holding the trash tray to the base plate.

Once the magnets are separated by the float apparatus during a high water condition, the sensor sends a signal to the receiver such as a smart phone, tablet, computer or other electrical device notifying a selected individual that it is likely that the primary drain and/or the primary roof drainage system has malfunctioned and/or is plugged by debris.

The building maintenance person can take the necessary steps to remedy the problem or problems with the primary drain and/or drainage system The overflow sensor comprises a housing, a magnet, a water flow sensor, and a control module which is disposed in the housing. The control module is operatively in communication with the water flow sensor. In the illustrated embodiment, such communication is performed by leads or wires that couple the control module and the contacts. It is contemplated that other types of communication between the control module and the sensor can be employed. For example, the control module and the water flow sensor can communicate wirelessly with the addition of appropriate transmitter and receiver circuitry.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

I claim:

1. A roof scupper overflow, comprising:

a base plate having a center opening for fluid communication with a drain and an inner edge for attachment along an edge of a roof;

said base plate supporting a frame;

said frame including a slidable housing in cooperative engagement therewith;

said slidable housing including a sieve tray supported by said base plate in cooperative magnetic engagement therewith;

said sieve tray comprising a sieve plate including a plurality of perforations therethrough;

said slidable housing including a float secured between opposing side walls and a top flange and spaced apart aligned side flanges;

a vertically positioned screen contiguous to said sieve plate and spaced apart a selected distance from the inner edge and affixed to an inner solid portion of a surface of said sieve plate;

said float having a lower inner wall portion attaching to an upper screen portion;

a WIFI magnetic sensor module supported by a pair of spaced apart aligned module support arms;

whereby rising water floating said foam buoy raises said sieve tray and said screen breaking a magnetic connection between said sieve plate and said base plate and sending a signal to said WIFI magnetic sensor module to notify a user of a water overflow condition.

2. The roof scupper overflow of claim 1, said sieve plate including a plurality of teeth projecting from a periphery thereof.

3. The roof scupper overflow of claim 1, wherein said float comprises a closed cell foam buoy.

4. The roof scupper overflow of claim 1, wherein said float is selected from the group consisting of a closed cell foam buoy, an air filled buoy, a container filled with particles of cork, foam, and combinations thereof.

5. The roof scupper overflow of claim 1, wherein said WIFI magnetic sensor module is in communication with a water flow sensor including an indicator activated upon detachment of said sieve tray from said base plate indicating a potential flooding situation of a roof drainage system.

6. The roof scupper overflow of claim 1, wherein said base plate is affixed to the roof forming a water tight seal therewith.

7. The roof scupper overflow of claim 1, including magnetic means mounting to a bottom surface of said sieve tray in magnetic engagement with said base plate.

8. The roof scupper overflow of claim 1, said WIFI magnetic sensor module including a communication module having a receiver and a transmitter for transmitting measurement data received from a water level magnetic switch sensor by WIFI to an address by electronic mail, a phone message, or a text message to a selected device selected from the group consisting of a smart phone, a tablet, a computer, or other electrical device notifying a selected entity that a primary drain and/or a primary roof drainage system has malfunctioned and/or is plugged by debris and the potential for a roof flooding event.

9. The roof scupper overflow of claim 1, whereby upon trash building up around said upper screen portion reducing a flow of water therethrough raises said float causing said sieve tray held in position by said magnetic connection to break said magnetic connection and rise and move upward contacting at least one magnet at a top of said roof scupper holding it in a raised position letting water run into said drain at roof level, and said water level magnetic switch sensor sending a text message, an electronic mail or other notice to an address of a selected entity including which drain is effected providing a location, a time, and a date or a report.

10. The roof scupper overflow of claim 1, including at least one side screen panel projecting from sides of said frame mounted at a selected angle to the roof curb or sidewall surrounding a flat roof to prevent debris from moving around said roof scupper.

11. The roof scupper overflow of claim 1, whereby the WIFI magnetic sensor module is spaced apart from and centered over a top of a roof drain strainer cap.

12. A roof scupper overflow, consisting of:

a base plate having a center opening for fluid communication with a drain and an inner edge for attachment along an edge of a roof;

said base plate supporting a frame;

said frame including a slidable housing in cooperative engagement therewith;

said slidable housing including a sieve tray supported by said base plate in cooperative magnetic engagement therewith;

said sieve tray comprising a sieve plate including a plurality of teeth projecting from a periphery thereof and a plurality of perforations therethrough;

said slidable housing including a foam buoy secured between opposing side walls and a top flange and spaced apart aligned side flanges;

a vertically positioned screen contiguous to said sieve plate and spaced apart a selected distance from the inner edge and affixed to an inner solid portion of a surface of said sieve plate;

said foam buoy comprising a foam material having a lower inner wall portion attaching to an upper screen portion;

a WIFI magnetic sensor module supported by a pair of spaced apart aligned module support arms; and whereby rising water floating said foam buoy raises said sieve tray and said screen breaking a magnetic connection between said sieve plate and said base plate and sending a signal to said WIFI magnetic sensor module to notify a user of a water overflow condition.

* * * * *